US012651076B2

(12) United States Patent　　(10) Patent No.:　US 12,651,076 B2

Ruiz Ayesta　　(45) Date of Patent:　Jun. 9, 2026

(54) VULNERABILITY DETECTION AND SMART REMEDIATION USING RUNTIME DATA

(71) Applicant: Datadog, Inc., New York, NY (US)

(72) Inventor: Joseba Ander Ruiz Ayesta, Bilbao (ES)

(73) Assignee: Datadog, Inc., New York, NY (US)

( * ) Notice: Subject to any disclaimer, the term of this patent is extended or adjusted under 35 U.S.C. 154(b) by 53 days.

(21) Appl. No.: 18/771,683

(22) Filed: Jul. 12, 2024

(65) Prior Publication Data

US 2026/0017382 A1　　Jan. 15, 2026

(51) Int. Cl.
G06F 21/57　　(2013.01)

(52) U.S. Cl.
CPC ...... G06F 21/577 (2013.01); G06F 2221/034 (2013.01)

(58) Field of Classification Search
CPC ............. G06F 21/577; G06F 2221/033; G06F 2221/034
See application file for complete search history.

(56) References Cited

U.S. PATENT DOCUMENTS

| | | | |
|---|---|---|---|
| 11,893,120 B1 * | 2/2024 | Jennings | G06F 8/433 |
| 2021/0026756 A1 * | 1/2021 | Magnezi | G06F 11/3688 |
| 2022/0083667 A1 * | 3/2022 | Anwar | G06F 8/75 |

* cited by examiner

*Primary Examiner* — Esther B. Henderson

(74) *Attorney, Agent, or Firm* — Lerner David LLP

(57) ABSTRACT

The present disclosure describes a system and method for generating a dependency tree for program information collected at runtime, and enriching the dependency tree with information relating to how frequently functions are called at runtime. The present disclosure further provides for detecting vulnerabilities in functions, and generating recommendations for an optimal remediation that efficiently addresses one or more vulnerabilities. Either or both of the vulnerabilities and the remediations may be sorted and ranked, such that the most critical vulnerabilities are identified and the most effective remediations are identified.

23 Claims, 12 Drawing Sheets

| | | | UPGRADE | DEPENDENCY | IMPACTED | LAST |
|---|---|---|---|---|---|---|
| | LIBRARY | VERSION VULNERABILITIES | TO | TYPE | SERVICES | DETECTED |
| | a.a.hiabcde-common | 2,85 3 C 8 H 4 M 1 L | 2.9.6(524) | - | 2 ⚓ | just now |
| | Service/Name1 | 0 C 8 H 4 M 0 L | | Direct | | just now |
| | Service/Name2 | 3 C 8 H 4 M 1 L | | Transitive | | just now |
| | o.a.hiabcde-common | 2,85 3 C 8 H 4 M 1 L | 2.9.6(524) | - | 2 ⚓ | just now |
| | o.a.hiabcde-common | 2,85 3 C 8 H 4 M 1 L | 2.9.6(524) | - | 2 ⚓ | just now |
| | o.a.hiabcde-common | 2,85 3 C 8 H 4 M 1 L | 2.9.6(524) | - | 2 ⚓ | just now |
| | o.a.hiabcde-common | 2,85 3 C 8 H 4 M 1 L | 2.9.6(524) | - | 2 ⚓ | just now |

Group By   None   vulnerability   Library

Search for 🔍 Search vulnerability Libraries

˅ CORE

◧ Hide Controls

˅ Severity
☐▢ Critical   123
☐▢ High   325
☐▢ Medium   188
☐▢ Low   12
☐▢ Unknown   1

˃ Environment

˃ Service

˃ Language

˅ Source
☑ Library   648
☑ Custom code   1

˃ Library 710   720   730   740   750   760   770

Build dependency tree at runtime

1120

Enrich dependency tree

1130

Identify vulnerabilities

1140

Suggest remediation

1200

VULNERABILITY DETECTION AND SMART REMEDIATION USING RUNTIME DATA

BACKGROUND

Dependency trees are generally created by analyzing source code. However, when observing a computing environment at runtime, the source code may not be accessible. Without being able to access the dependency tree, it is difficult to figure out which dependencies are associated with publicly known vulnerabilities. Accordingly, even if a vulnerable library for a program is detected, it is difficult to ascertain the downstream effects of how replacing that vulnerable library would impact other libraries utilized by the program.

BRIEF SUMMARY

The present disclosure describes a system and method for generating a dependency tree based on program information collected at runtime, and enriching the dependency tree with information relating to how frequently components are called at runtime. The present disclosure further provides for detecting vulnerabilities in the components of the program, and generating recommendations for an optimal remediation that efficiently addresses one or more of the vulnerabile components. Either or both of the vulnerabilities and the remediations may be sorted and ranked, such that the most critical vulnerabilities are identified and the most effective remediations are identified.

One aspect of the disclosure provides a system comprising memory and one or more processors in communication with the memory. The one or more processors may be configured to receive a collection of information from a computing environment at runtime, the collection of information identifying a plurality of components, identify, within the collection of information, one or more libraries for the plurality of components, determine dependencies for each of the one or more libraries, and generate a dependency tree for the plurality of components based on the determined dependencies for each of the one or more libraries. In some examples, the one or more processors are further configured to enrich the dependency tree. Enriching the dependency tree may include determining a number of times that each of one or more particular functions are called at runtime, and adding annotations to the dependency tree based on the determined number of times. The one or more processors may be configured to determine particular function calls within the collection of information that are most commonly executed at runtime. The one or more processors may be configured to determine particular function calls within the collection of information that are never executed at runtime. The one or more particular function calls may correspond to a function with vulnerabilities. The one or more processors may be configured to recommend one or more remediations for the vulnerabilities. The one or more remediations may include a change set, wherein the change set identifies a number of required changes to one or more components to remediate one or more of the vulnerabilities. The one or more processors may be configured to rank multiple remediation options, such as by ranking based on one or more of: a number of vulnerabilities each remediation option will address, a number of critical vulnerabilities each remediation option will address, or a ratio of number of changes to number of remediations.

The one or more processors may be configured to detect vulnerabilities, and remediate the detected vulnerabilities each time the dependency tree changes at runtime. Generating the dependency tree may include calculating all sub-trees for each of the one or more libraries by traversing dependencies and checking whether the dependency is present. The one or more processors may be configured to determine that any library that is not found during the traversing is a direct dependency, and build the tree using the direct dependencies.

Another aspect of the disclosure provides a method of generating a dependency tree using information available at runtime of a program, the method comprising receiving, with one or more processors, a collection of information from a computing environment at runtime, the collection of information identifying a plurality of components, identifying, with the one or more processors, within the collection of information, one or more libraries for the plurality of components, determining, with the one or more processors, dependencies for each of the one or more libraries, and generating with the one or more processors, a dependency tree for the plurality of components based on the determined dependencies for each of the one or more libraries.

The method may further include enriching the dependency tree, such as by receiving logging information indicating how particular functions are called at runtime, and adding annotations to the dependency tree based on the logging information.

The method may further include identifying vulnerabilities in the one or more libraries, and determining one or more remediation actions for the vulnerabilities based at least in part on the logging information. The one or more remediation actions may include a change set, wherein the change set identifies a number of required changes to one or more components to remediate one or more of the vulnerabilities. The method may further include ranking multiple remediation actions based on one or more of: a number of vulnerabilities each remediation option will address, a number of critical vulnerabilities each remediation option will address, or a ratio of number of changes to number of remediations.

Yet another aspect of the disclosure provides a computer-readable medium storing instructions executable by one or more processors for performing a method of generating a dependency tree using information available at runtime of a program. Such method may include receiving a collection of information from a computing environment at runtime, the collection of information identifying a plurality of components, identifying within the collection of information, one or more libraries for the plurality of components, determining dependencies for each of the one or more libraries; and generating with the one or more processors, a dependency tree for the plurality of components based on the determined dependencies for each of the one or more libraries. Such method may further include enriching the dependency tree, comprising receiving logging information indicating how particular functions are called at runtime, and adding annotations to the dependency tree based on the logging information. It may further include identifying vulnerabilities in the one or more libraries, and determining one or more remediation actions for the vulnerabilities based at least in part on the logging information. The one or more remediation actions may include a change set, wherein the change set identifies a number of required changes to one or more components to remediate one or more of the vulnerabilities. The method may further include ranking multiple remediation actions based on one or more of: a number of vulnerabilities each remediation option will address, a number of critical vulnerabilities each remediation option will address, or a ratio of number of changes to number of remediations.

BRIEF DESCRIPTION OF THE DRAWINGS

FIG. 7 illustrates an example of an enriched dependency tree according to aspects of the disclosure.

DETAILED DESCRIPTION

Figure 1:
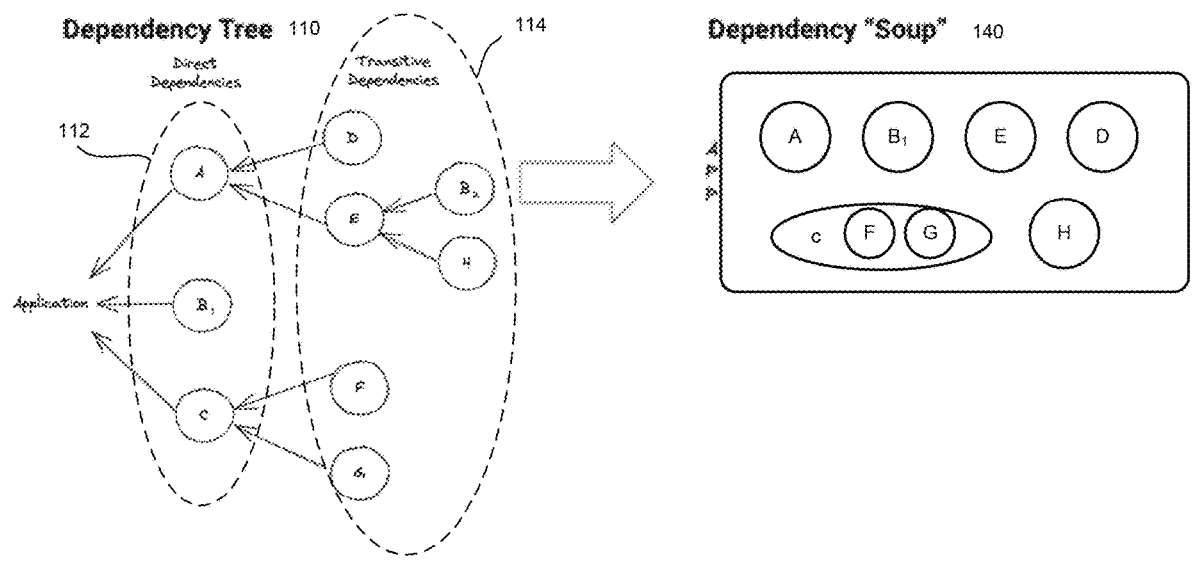
FIG. 1 illustrates an example of components in a dependency tree at build time and an appearance of the components without visible dependencies at runtime, according to aspects of the disclosure.

The present disclosure relates to building a dependency tree for a program without relying on source code. The dependency tree is built from a collection of information obtained from a customer computing environment at runtime, where access to source code is not available. The collection of information may include information about components such as libraries, executables, frameworks, services, modules, plugins, widgets, controls, connectors, etc. The components can further include function calls, operations, etc. Some components may depend on the others, and the dependencies may be direct or transitive. Direct dependencies may rely on third party open source components, commercial components, or a combination. Transitive dependencies occur when those third party open source or commercial components make calls to other components.

The dependency tree may be built by crawling the metadata present in third party library repositories and identifying libraries, determining dependencies for each library, and mapping the dependencies in a data structure, such as a table. Those dependencies can be enriched using logging information. The logging information may be obtained, for example, from a program that is instrumented to include additional logging when the program is run. Such logging information may include, for example, a time stamp, function name, parameter values, library identifier (e.g., hash of the library), file offset, function signature or "type signature" (e.g., function name and types of arguments/parameters), etc. for each function call. Using those enriched dependencies in the data structure and logging, the dependency tree is calculated for a program (e.g., web service). Such calculation may include obtaining a list of the libraries used by the program, and calculating all subtrees for all the libraries by traversing dependencies and checking whether the dependency is present. Any library that is not found during the traversing is a direct dependency, and the direct dependencies are used to build the tree. Calculation of the tree may be triggered any time a component is added, deleted, or updated (e.g., a new version of the component).

In some examples, an inventory of libraries and dependencies of those libraries is built by crawling the web and adding metadata for the detected libraries and enriched dependencies to a data store (e.g., database). The inventory may be supplemented with metadata for other libraries detected in the information obtained from the computing environment. The inventory may be used to more quickly identify libraries and dependencies in subsequent collections of information from customers.

In some examples, the dependency tree may be enriched. Enriching may include adding granularity at the function level, such as by annotating in the dependency tree which functions are often used or never used. In this regard, it may be determined whether a particular function that is loaded at runtime is ever actually called. If the particular function is vulnerable, but it is never called at runtime, then the vulnerability may not result in an actual program vulnerability. As such, it may be sorted and ranked, such that more critical vulnerabilities are resolved first.

The calculated enriched dependency tree will impact smart vulnerability remediation. Smart remediation is a process that, considering all contextual information, tries to identify optimal vulnerability fixes. Those fixes are actions that could be taken to remove those vulnerabilities, but solving as many issues as possible with a single action. This can be achieved using the enriched tree and the full understanding of the impact of the vulnerabilities in all libraries across all the released versions of those libraries. There can be many fixes for the vulnerabilities, and those fixes can be sorted and ranked to identify the best fix that solves the greatest number of critical vulnerabilities, thereby minimizing the effort taken to solve those vulnerabilities. The enriched dependency tree will allow creating actions that will solve vulnerabilities in several libraries, by updating a single direct dependency, even further reducing the time taken to solve program issues.

Similar to the library inventory, a vulnerability inventory may be created by crawling the web and identifying publicly reported vulnerabilities. Each of the vulnerabilities may be mapped to a library and stored in a database. In some examples, the vulnerabilities may be mapped to particular functions within the libraries. The inventory may be sorted by the list of vulnerabilities, or by the remediations to show which remediation would resolve the most vulnerabilities.

FIG. 1 illustrates an example of components of a program in a dependency tree 110 at build time. The dependency tree 110 includes direct dependencies 112 and transitive dependencies 114. Direct dependencies may include, for example, open source and commercial components that are directly relied upon by the program (e.g., an application). Sometimes, those open source and commercial components may be built using other components, thereby forming indirect or transitive dependencies between the other components and the program.

The dependency tree 110 is typically not available to an entity executing the program at runtime. Logging information generated by the program at runtime may be used to determine the dependencies, but the logging information is a collection of components lacking relational structure, herein referred to as "dependency soup" 140.

The logging information may be output by the program at runtime as a result of the program being instrumented.

Instrumentation may include modification of the software, such as at the source code or binary code level, to enable measurements of dynamic behavior at runtime. Instrumentation can include logging events, such as failures, operation start/end, etc. Other examples include measuring a duration of operations and logging the measured duration. Instrumenting the program may be performed using instrumentation libraries or frameworks, which modifies the program to use logging statements.

Logging may include tracing, such as capturing and recording information about the execution of the program. The tracing may be used for anomaly detection, fault analysis, debugging, diagnostics, etc. Accordingly, the logging information output during execution of the instrumented program may include tracing information or trace data.

In the dependency soup 140, all components appear to be equal, and it is unknown whether dependencies are direct or transitive. For example, while it was clear in the source code dependency tree 110 that D and E are transitive dependencies, that is not clear in the dependency soup 140 collected at runtime from the logging information. For many processes it is important to understand if a dependency is direct or transitive because the solution may be different.

The present disclosure describes a dependency tree resolver, which generates a resolved dependency tree from the dependency soup 140. Generating the resolved dependency tree includes solving the closest dependency tree that results in the dependencies in the logging information. Particularly if no source code integration is present, the resolved dependency tree will be the simplest one that results in the current dependencies. The resolved dependency tree may not be exactly the same as the original dependency tree 110 from the source code.

There are two main types of transitive dependencies: normal transitive dependencies and packed dependencies. Normal transitive dependencies may occur most frequently, and are included in the final program as normal dependencies. For example, in the dependency soup 140 the normal transitive dependencies are D, E, and H. Packed dependencies occur less frequently, and include dependencies packed inside a parent dependency. For example, F and G are packed inside C in the dependency soup 140. A packed dependency implies that one library is including dependencies inside its final deliverable instead of exporting those dependencies. As such, the packed dependencies are not easily detectable. For example, for the program using C library, the F and G libraries are no longer easily detectable because F and G are packed in C.

Figure 8:
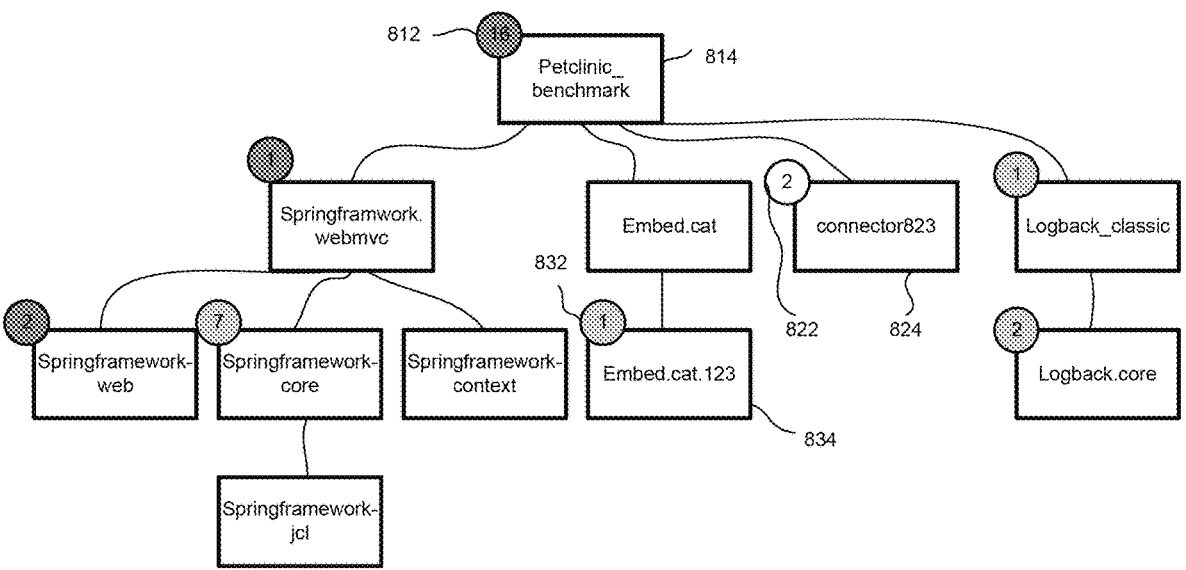
FIG. 8 illustrates another example of an enriched dependency tree indicating vulnerabilities of different degrees, according to aspects of the disclosure.

Examples of resolved dependency trees are illustrated in FIGS. 7 and 8, and described further below. Each dependency may be marked as direct or transitive. In some examples, the resolved dependency tree may be used to resurface vulnerabilities and security issues for the program.

Figure 2:
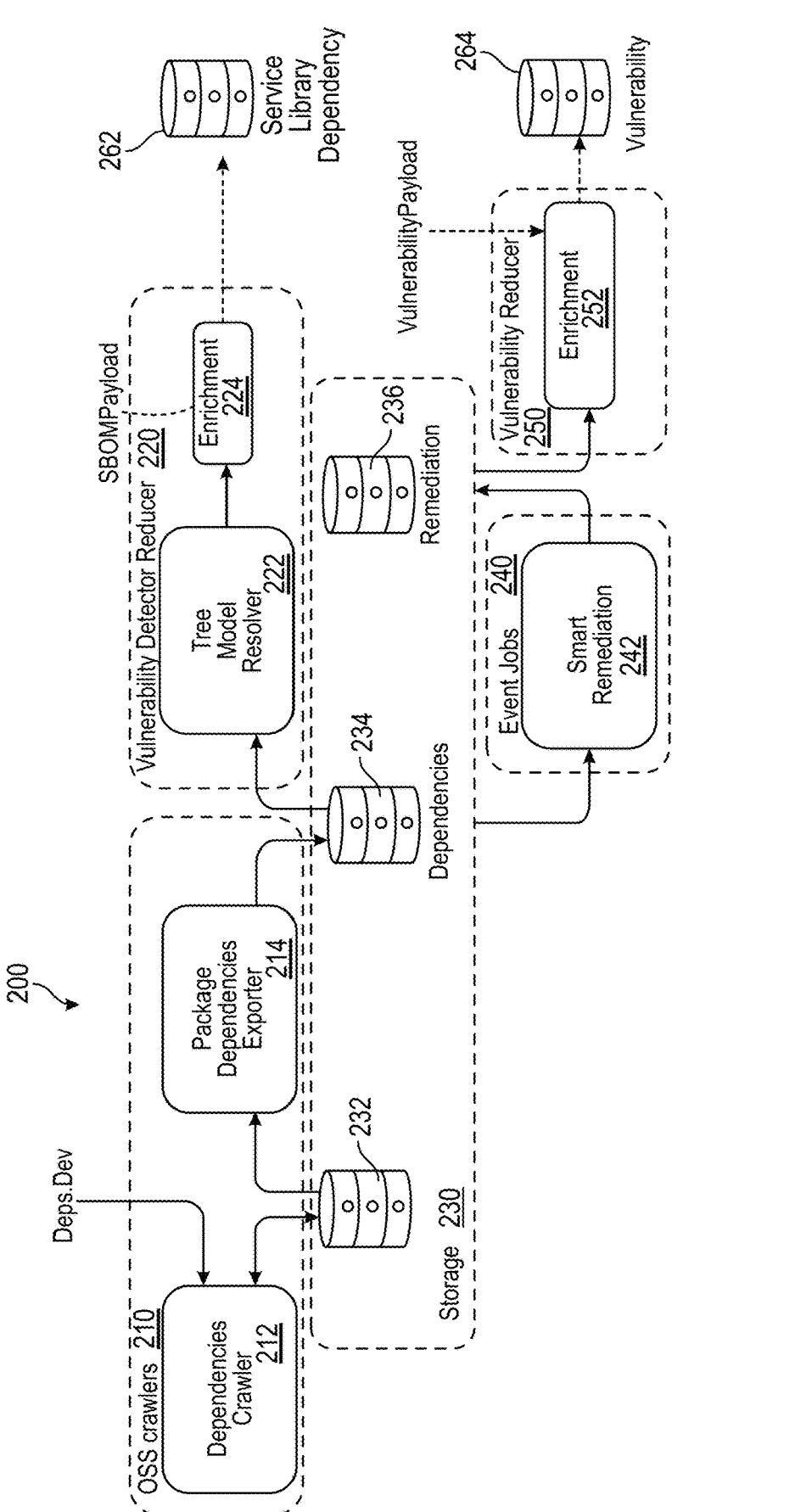
FIG. 2 illustrates an example system for generating dependency trees using information available at runtime and determining remediations for vulnerabilities, according to aspects of the disclosure.

FIG. 2 illustrates an example system 200 for generating dependency resolved trees using runtime information. The system 200 may further identify vulnerabilities in relation to the resolved dependency tree, and determine remediations for the vulnerabilities.

The system 200 includes one or more dependency crawlers 212. The crawlers 212 may gather information about components, such as from public open source libraries. Gathering the information may include accessing metadata for the libraries. In some examples, gathering the information may include accessing the public open source libraries and performing a static and/or runtime analysis to gather the metadata.

The one or more crawlers may be available in, for example, open source software (OSS) 210. According to some examples, a dedicated crawler may be provided for each programming language used by the program. The crawlers 212 may receive dependency information from, for example, an available application programming interface (API), website, or the like, such as the deps.dev API. The crawlers 212 may each create a new table in a schema 232 in storage 230, and store dependency information in the new table. According to some examples, only direct dependencies are stored. The new table may include various fields, such as a raw data field, version field, etc. The raw data field may be a protocol buffer serialization of the dependencies. In some examples, only direct dependencies for a dependency are stored. The version field could be a fixed version or a range depending on the library definition.

According to some examples, a new crawler may be created to get information about a single language. For example, the new crawler may obtain the information from the original language crawler and save the information to the new table serializing the direct dependencies for each package.

The system 200 also includes a package dependency exporter 214 in the OSS 210. A package dependency exporter 214 will obtain the information from the dependency table in the schema 232 and create a key-value store database 234 that will be used by different actors. The structure may be similar to table in schema 232. The value of the key-value store database 234 may be the raw data in the table, and the key may be a combination of information, such as language, name, version, etc. The key-value store database 234 may be exported for dependency tree resolution by tree model resolver 222 in vulnerability detector reducer 220. The exported key-value store database 234 may include information for all languages.

Tree model resolver generates the resolved dependency tree based on information, such as component information stored in the vulnerability detector reducer 220 and dependency information from the key-value store database 234. The component information may include, for example, component name, component version, language, ecosystem, etc. The vulnerability detector reducer 220 may be a software module that receives information gathered about components for programs using different mechanisms for collecting observability data or logging information. The vulnerability detector reducer 220 may call a tree resolution routine whenever needed, such as when components are added or deleted or updated. The resolved dependency tree may be calculated for an entire program, including all components in or called by the program.

The vulnerability detector reducer 220 obtains library metadata (e.g., version, name, etc.), such as from a telemetry channel through which trace data is received. Accordingly, the tree model resolver 222 obtains information about libraries associated with the program (e.g., called by the program), without needing to access the library itself. For example, the tree model resolver 222 may access information about the libraries through available websites or other open source resources.

According to some examples, obtaining the information about the libraries may include accessing public open source libraries, such as to perform a static and/or runtime analysis to gather metadata. The gathered information may be added to inventory, such that it can be used for determining dependencies in the dependency soup. The analysis may include, for example, comparing different versions of the library to determine changes between the versions. If an older version does not include a vulnerability, but a newer version introduces the vulnerability, reviewing source code changes between the old and the new version may reveal one or more added functions. If one function was added, it may be inferred that the added function introduced the vulnerability. If multiple functions were added, the added functions may be flagged as potentially associated with the vulnerability.

Figure 3:
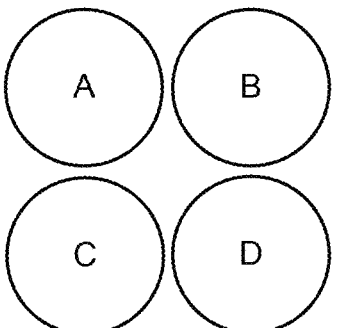
FIGS. 3-6 illustrate an example of generating a dependency tree using information available at runtime, according to aspects of the disclosure.
Figure 4:
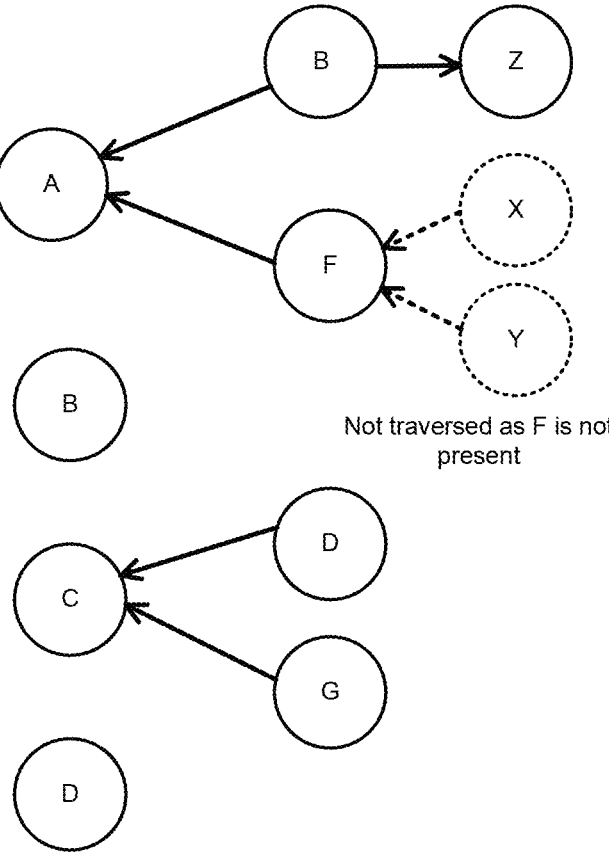

FIG. 3 illustrates an example list of components (e.g., libraries for a micro service). In this example, the libraries include A, B, C, and D. The tree model resolver 222 then calculates all subtrees for all libraries. For example, with regard to the libraries in the example of FIG. 3, the tree model resolver 222 would calculate the dependency tree for A, B, C, and D, as shown in FIG. 4.

While traversing dependencies, the tree model resolver 222 checks whether the dependency is present or not in the functions called by the program. For example, as discussed above, the tree model resolver 222 receives information about the libraries present in the program, and creates a subtree for those libraries. If the dependency is present, the tree model resolver 222 may continue deeper into the branch to identify additional dependencies. For example, as shown in FIG. 4, the tree model resolver 222 identifies the dependency of library B on library A. It continues to determine dependencies for library B, and identifies Z as a further extension of the branch. If the dependency is not present, the tree model resolver 222 does not look deeper into the branch and instead moves to the next library. For example, with regard to FIG. 4, the tree model resolver 222 identifies library F as depending on library A. However, because library F is not present in the functions called by the program, and is therefore not one of the libraries in the dependency soup of FIG. 3, the tree model resolver 222 does not continue to look for further dependencies on library F. While libraries X and Y further depend from F, it is not relevant to the program and therefore the tree model resolver 222 omits the further calculations, thereby conserving processing power that would otherwise be consumed by the further calculations. This omission further conserves memory that would be consumed by storing the relationships of the additional tree nodes, and conserves power that would be consumed by displaying the additional nodes. Instead, the tree model resolver 222 moves on to analyze library C, and identifies libraries D and G as dependencies.

Figure 5:
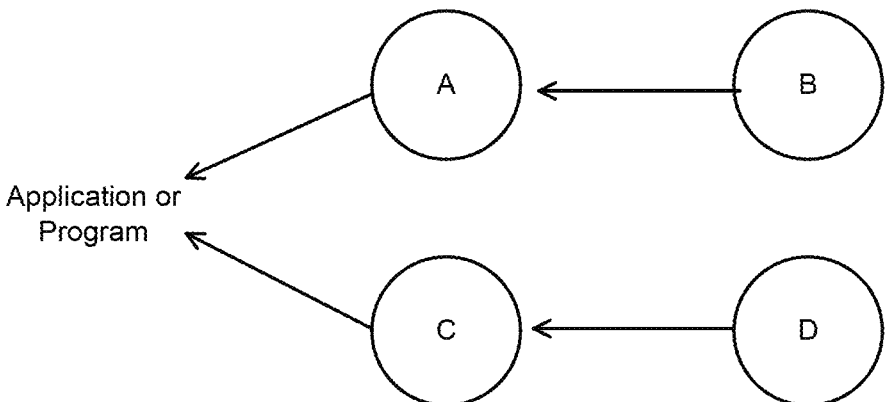

FIG. 5 illustrates an example of a simplest tree resulting from the traversing of the libraries in the dependency soup of FIG. 3. Any library that is not found in the traversing of another library may be identified as a direct dependency. In this example, libraries A and C are identified as direct dependencies. Transitive dependencies may be placed as close as possible to a root of the tree. In this example, transitive dependencies B and D are placed in the tree, in relation to the libraries A and C from which they respectively depend.

Returning to FIG. 2, enrichment module 224 may enrich the resolved dependency tree with additional information. According to some examples, the additional information may indicate whether components are direct or transitive, and/or a position in the resolved dependency tree for the component. In some examples, the additional information may include logging information output at runtime of an instrumented program. Such logging information may include, for example, a time stamp, function name, parameter values, library identifier (e.g., hash of the library), file offset, function signature or "type signature" (e.g., function name and types of arguments/parameters), etc. for each function call. The logging information may be used to determine how frequently a given function is called. For example, timestamps and function identifier may be used to detect whether the function is called many times during runtime, never, or any number of times.

According to some examples, the resolved dependency tree may further be enriched with vulnerability information. The vulnerability information may include issues reported, detected errors, outdated versions, security risks, or any other potential issues.

Figure 6:
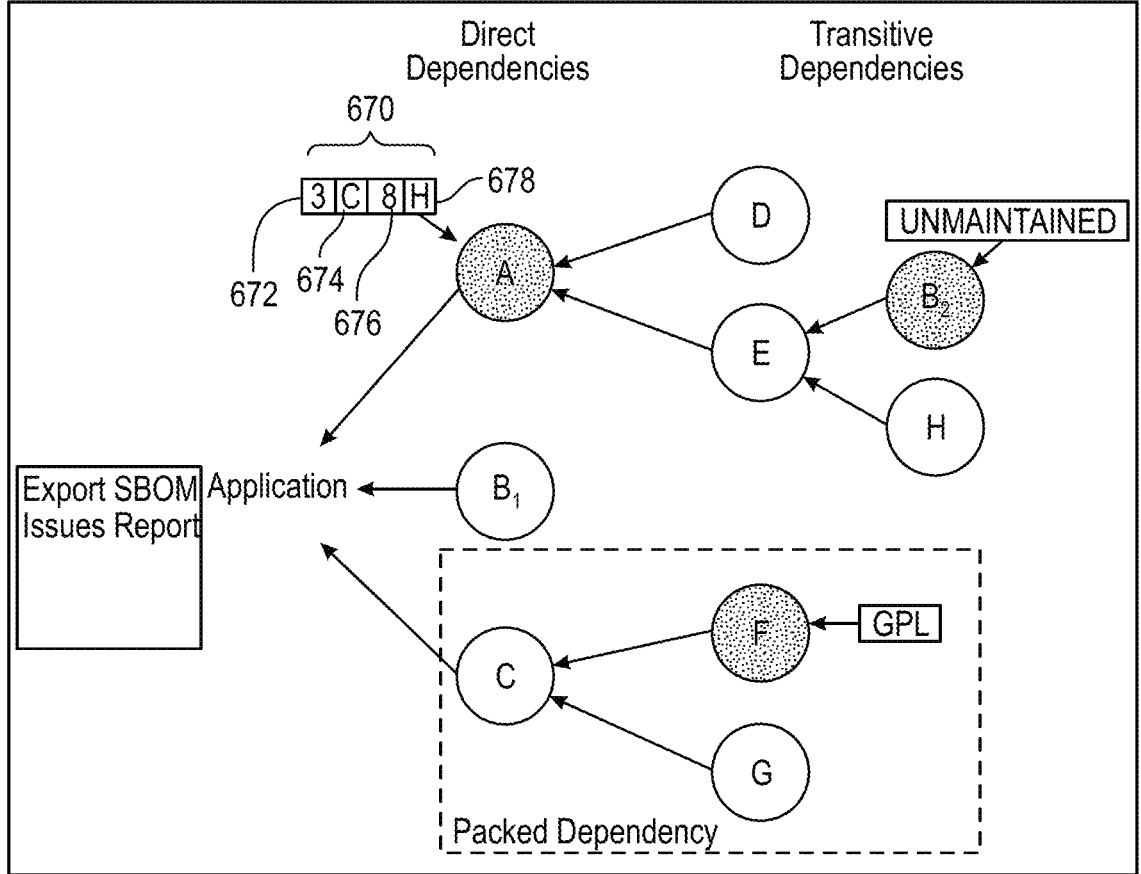

FIG. 6 illustrates an example of a resolved dependency tree enriched with vulnerability information. In this example, the enriched resolved dependency tree includes vulnerability information 670, which indicates a number of vulnerabilities for each vulnerability level. For example, as shown, the vulnerability information includes fields 672, 674, together indicating 3 vulnerabilities at a critical level of concern. Further, it includes fields 676, 678, together indicating 8 vulnerabilities at a high level of concern.

The vulnerability information may be displayed in connection with each node of the tree associated with a vulnerability, whether the node represents a transitive dependency or direct dependency. In other examples, the vulnerability information may be displayed in connection with only direct dependencies.

In the example of FIG. 6, the enrichment information further indicates issues or potential issues with transitive dependencies. For example, node B2 represents a later version of B1. However, as library B2 may not be maintained, this information may be annotated in the enriched resolved dependency tree.

The enrichment data may further indicate packed dependencies. For example, with respect to library C, the enriched resolved dependency tree identifies nodes F and G as packed dependencies.

While FIG. 6 provides some examples of enrichment information, and how that enrichment information may be surfaced to a user on a display, it should be understood that various other types of enrichment information may be included in the resolved dependency tree. Moreover, the enrichment information may be surfaced to the user through any of a variety of graphics, annotations, or the like.

Further, enrichment of the resolved dependency tree is not limited to vulnerability information. Other types of information may be added to the resolved dependency tree, in addition or in the alternative to the vulnerability information. Examples of such other types of information may include usage information, such as how many times or how frequently a function is called by the program at runtime.

Different vulnerabilities carry different levels of risk based on, for example, their severity and the likelihood that they'll be exploited. A level of risk for the vulnerabilities can be measured in different ways, and the vulnerabilities can be prioritized based on the measurements and other attributes, such that the most critical vulnerabilities may be prioritized for earliest remediation. The measurements and attributes for prioritizing vulnerabilities can include, for example, standardized vulnerability scores, threat activity data, runtime context, detection of sensitive resources, detection of resources running in production, detection of vulnerabilities having available public exploits, detection of exploitation probability based on external factors (e.g., Cybersecurity and Infrastructure Agency (CISA) or exploit prediction scoring system (EPSS) score), etc.

One example ranking mechanism for vulnerabilities scores the vulnerabilities based on severity. The scores may be expressed as values within a given range, with higher values reflecting greater severity. Qualitative ratings may be based on the scores. For example, scores above a threshold value can be categorized as "critical" while scores between two lower threshold values may be categorized as "medium." Data used for generating the scores may be from one or more metric groups that measure different dimensions of potential risk. Such dimensions can include severity in general, based on a potential impact a vulnerability could have on the confidentiality or integrity of a program's data, and how it could disrupt the program's availability if it were exploited, ignoring factors specific to an affected environment or business. The scores may account for the conditions required for a successful attack, such as whether the attacker needs to have elevated permissions. Other metrics can augment scores to reflect severity in a given environment at a particular moment in time. For example, such metrics can account for local context factors that affect risk, such as financial and legal impacts to an organization in the event of a data breach.

Another example ranking mechanism may prioritize vulnerabilities based on a probability of the vulnerability being exploited within a given time period. Such mechanisms may utilize machine learning and most recent threat activity data to recompute vulnerability scores periodically or continuously.

In some examples, authoritative lists or catalogs of active threats may be maintained by an agency or organization. The catalog may include a description of each vulnerability, an identifier for the vulnerability, and a recommended remediation action. Ranking or prioritization may consider such authoritative lists as a factor. For example, presence of a vulnerability on the authoritative list may result in a higher ranking for the vulnerability.

Vulnerabilities can be detected through static analysis, runtime analysis, or a combination thereof. The static analysis may involve examining code (e.g., source code, byte-code, or machine code) without running it. The runtime analysis may involve examining code that is being run (e.g., executed). Some vulnerabilities detected at runtime may not be perceived in a static analysis. Moreover, some vulnerabilities detected in static analysis can introduce unexpected behavior at runtime. According to some examples, the context in which the vulnerability was detected may impact its ranking or prioritization for remediation.

FIG. 7 illustrates another example view of a resolved dependency tree. In this example, rather than illustrating the tree structure with branches, the resolved dependency tree is shown in table format, with enrichment information listed in different columns of a row corresponding to the relevant library. In this particular example, column 710 identifies the library by name, and column 720 identifies a version number for the library. Column 730 identifies vulnerability information. Column 740 identifies other versions of the library, such as upgrade versions. Column 750 indicates dependency information, such as whether the library is a direct dependency or a transitive dependency. Column 760 indicates a number of programs impacted by the library. Column 770 indicates a last time the library was detected. While FIG. 7 illustrates examples of a number of different types of enrichment information for each library in the resolved tree structure, it should be understood that these are merely examples and that other or additional types of information may be included.

FIG. 8 illustrates another example of an enriched resolved dependency tree indicating vulnerabilities of different degrees. In this example, the enriched resolved dependency tree identifies direct and transitive dependencies represented in a tree structure. Moreover, nodes of the tree structure having identified vulnerabilities are annotated with vulnerability information. For example, root node 814 is associated with 16 vulnerabilities, indicated by annotation 812. The number of vulnerabilities at the root node may account for all vulnerabilities identified within the tree. Direct dependency 824 is associated with 2 vulnerabilities, indicated by annotation 822. Transitive dependency 834 is associated with 1 vulnerability, indicated by annotation 832. The annotations may indicate not only a number of vulnerabilities associated with the node, but a level of criticality. In the present example, the level is indicated by shade. For example, annotation 812 may indicate a highest level of criticality by its dark shade, while annotation 822 indicates a lowest level of criticality by its lightest shade. Annotation 832 is a medium level of criticality. While shading or color is one way of representing the level of criticality, other representations may be used. Similarly, while the annotations in FIG. 8 appear as bubbles at a top left corner of the associated nodes, it should be understood that the annotation may be of any form, size, shape, position, etc.

According to some examples, the enriched resolved dependency tree can be manipulated by a user, such as to show different views or different information. By way of example, the tree may be filtered, such as to show the branches stemming from only a particular direct dependency. As another example, filters may be turned on or off to surface different types of information in the annotations, such as number of times the library is called, options for remediation, etc.

Returning to FIG. 2, the system 200 may include a smart remediation module 242 that generates options for remediation of the vulnerabilities associated with the resolved dependency tree. The smart remediation module 242 may further sort and rank the remediation options, such that the best options are prioritized. Options may be ranked higher, or better than other options, if they remediate a greater number of vulnerabilities, higher level criticality vulnerabilities, a highest number of critical vulnerabilities, or based on other factors. The factors for prioritizing remediation options may be selected by a user. In this regard, the factors most important for a particular program can be selected for determining the best remediation option, and those factors can be different than those selected for another program.

In determining the best remediation, the smart remediation module 242 may obtain all library versions and run a matching process, creating metadata that links one library version and its matched vulnerabilities. For all versions that are vulnerable, the smart remediation module 242 obtains the dependent tree of libraries that include the vulnerable version as a transitive dependency. The smart remediation module 242 may create metadata that links the vulnerabilities of the dependents in the obtained dependent tree with the library version. One particular library may depend on several vulnerable transitive libraries. The smart remediation module 242 calculates remediation for each of the direct dependencies, and for the transitive dependencies. For example, for each version of each library, all dependencies may be calculated and all the vulnerabilities for those dependencies are identified. A list may be created identifying each version of each library of those transitive vulnerabilities. Once the list is created for one library, the best remediation for each vulnerability in each version may be calculated.

At runtime, every time the tree changes, the smart remediation module 242 may be executed to determine remediation options for the direct dependencies that bring vulnerable dependencies. Using the list of the versions for the transitive dependencies and the matches, the smart remediation module 242 calculates the transitive smart remediation for the program. This information may be input to the vulnerability detector reducer 220, for enrichment 224 of the resolved dependency tree and output to service library 262.

Identifying remediation options may include reviewing all future versions of a library to identify a version that would address the vulnerability. In some examples, all versions may be preinspected and stored in memory in association with its state, conditions, etc. In this regard, the version to best resolve the vulnerabilities can be identified based on the stored information.

According to some examples, a single vulnerability can be mapped to a change set that fixes the vulnerability. The change set identifies a number of required changes to one or more components to remediate the vulnerability. For example, if a component in the dependency tree has a vulnerability, changes to that component may necessitate additional changes to upstream or downstream components because of interdependencies of the upstream or downstream components with the vulnerable component. The change set may identify all changes needed, including the changes to upstream and downstream components, to remediate the vulnerable component.

According to some examples, multiple remediations options may be available, each of which would fix the vulnerability in different ways. By way of example, if a vulnerable library is version 6.3, a first remediation option may be a next minor version without the vulnerability, such as version 6.7. A second remediation option may be a next major version without the vulnerability, such as version 7.0. Each of the first and second options may affect the transitive dependencies differently.

According to some examples, an aggregated change set can be proposed to remediate a set of vulnerabilities. For example, the aggregated change set may fix all critical vulnerabilities, or all high and critical vulnerabilities. In other examples, the aggregated change set may fix a cluster of similar vulnerabilities, such as those related to specific libraries.

The individual remediations, change sets, and/or aggregated change sets may be ranked based on effectiveness, and the best or most effective options may be presented to the user. The highest ranked options may solve the greatest number of vulnerabilities, the most vulnerabilities of a particular criticality level, etc. In other examples, the highest ranked options may fix the most vulnerabilities using a smallest number of changes, such that a small change fixing a number of vulnerabilities would be ranked higher than a larger change that fixes the same number of vulnerabilities.

Figure 9:
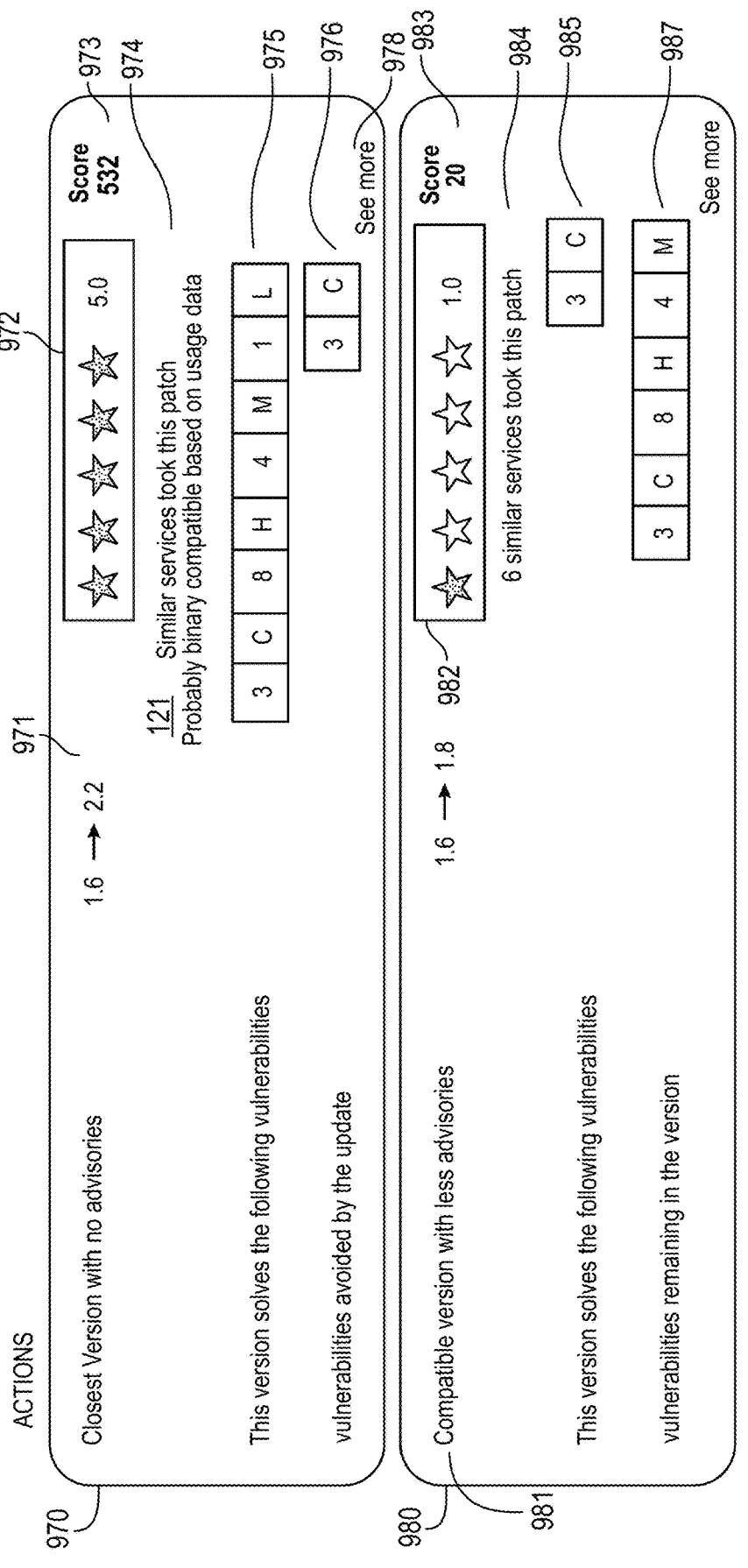
FIG. 9 illustrates an example of ranked remediations for vulnerabilities, according to aspects of the disclosure.

FIG. 9 illustrates an example of ranked remediations for vulnerabilities, according to aspects of the disclosure. As shown, two potential remediation actions 970, 980 are listed. While two potential actions are shown, it should be understood that any number of possible remediation actions may be considered and provided to the user. Each potential remediation action 970, 980 includes a description 971, 981 indicating what action would be performed by the remediation. For example, description 971 indicates that first remediation action 970 would update a version of the library from 1.6 to 2.2. The description 971 further indicates that version 2.2 is the closest version, without any advisories, to the existing library. For second remediation action 980, the description 981 indicates that the version would change from 1.6 to 1.8. It further describes that version 1.8 is a compatible version of the library with less advisories than the existing version.

Further information about the first and second remediation actions 970, 980 may be provided to the user. Such information may include, for example, identifications of vulnerabilities solved 975, 985 by each respective action 970, 980. The first remediation action 970 further indicates vulnerabilities avoided 976 by the update. The second remediation action 980 further indicates remaining vulnerabilities 987 that would still exist within the library if the remediation action 980 were implemented.

The indications of vulnerabilities solved 975, 985, vulnerabilities avoided 976, and vulnerabilities remaining 987 may identify a number of vulnerabilities and/or type of vulnerabilities. The illustrated example indicates a number of vulnerabilities for each level of criticality. This may allow for ease of comparison and evaluation among options for remediation actions 970, 980. While the first remediation action 970 would resolve 3 critical vulnerabilities, 8 high vulnerabilities, 4 medium vulnerabilities, and 1 low vulnerability, the second remediation action by comparison would only solve 1 low vulnerability.

In some examples, each remediation action 970, 980 may also indicate historical information 974, 984. The historical information 974, 984 may indicate how many other users implemented the respective remediation action 970, 980 in the past. In some examples, the historical information 974, 984 may further include feedback 972, 982 from other users. The feedback 972, 982 may take the form of ratings, reviews, general approval or disapproval, or any other type of feedback.

While various types of information are illustrated for each of the remediation actions 970, 980 in FIG. 9, additional types of information may also be considered and may be available to a user selecting between the options. In some examples, an expansion link 978 is provided for each remediation action, providing an opportunity for the user to access additional types of information.

The various information for each remediation action 970, 980 may be used to compute a respective score 973, 983. The scores 973, 983 may be used to rank the remediation actions 970, 980, such that an optimal remediation action can be recommended to the user. In the present example, the first remediation action 970 has a score 973 that is much higher than the second remediation action 980 score 983. The higher score is consistent with the higher number of vulnerabilities solved, lower number of remaining vulnerabilities, better feedback, and other attributes of the first remediation action 970 as compared to the second remediation action 980.

Returning to FIG. 2, enrichment 252 may be performed by vulnerability reducer 250. Such enrichment may include, for example, remediation of vulnerabilities for vulnerable components or for direct dependencies. For example, the enrichment may indicate if a first version of a first component depends on a first version of a second component that is vulnerable. In this regard, the remediation can avoid a version of the first component that depends on the vulnerable version of the second component.

Figure 10:
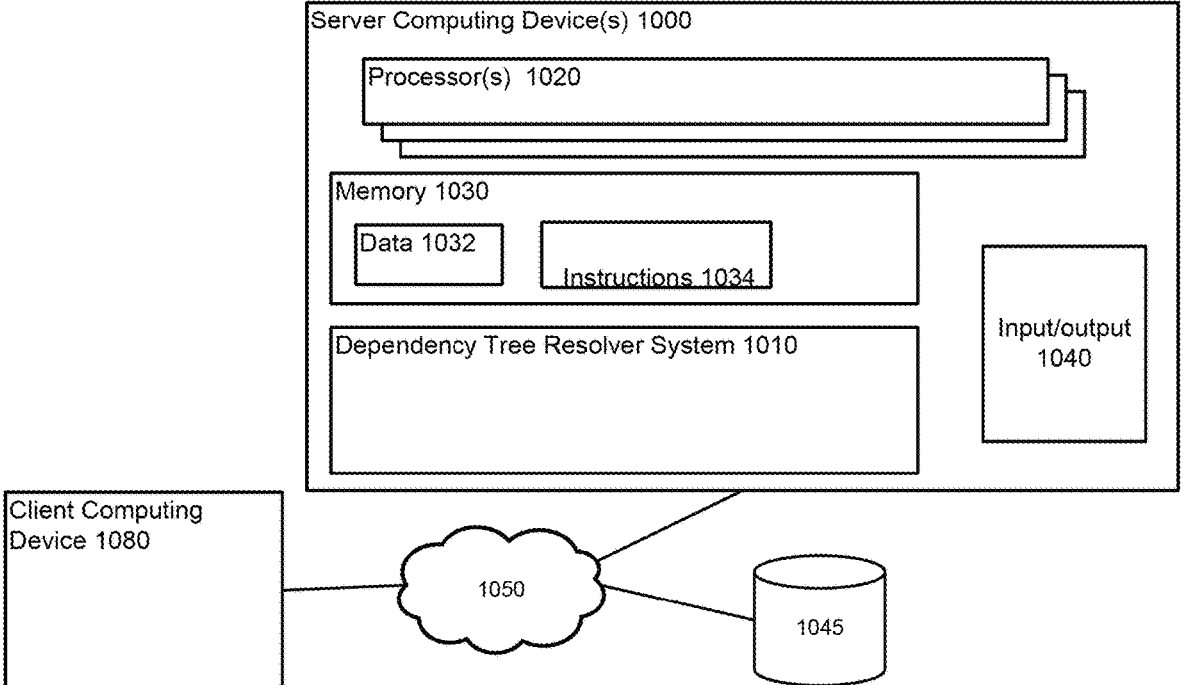
FIG. 10 illustrates an example computing environment for the dependency tree resolution system according to aspects of the disclosure.

FIG. 10 depicts a block diagram of an example environment for implementing a dependency tree resolver system 1010. The dependency tree resolver system 1010 can be implemented on one or more devices having one or more processors in one or more locations, such as in server computing device 1000. Client computing device 1080 and the server computing device 1000 can be communicatively coupled to one or more storage devices 1045 over a network 1050. The storage devices 1045 can be a combination of volatile and non-volatile memory and can be at the same or different physical locations than the computing devices. For example, the storage devices 1045 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 1000 can include one or more processors 1020, memory 1030, and input/output 1040. The memory 1030 can store information accessible by the processors 1020, including instructions 1034 that can be executed by the processors 1020. The memory 1030 can also include data 1032 that can be retrieved, manipulated, or stored by the processors 1020. The memory 1030 can be a type of non-transitory computer readable medium capable of storing information accessible by the processors, such as volatile and non-volatile memory. The processors can include one or more central processing units (CPUs), graphic processing units (GPUs), field-programmable gate arrays (FPGAs), and/or application-specific integrated circuits (ASICs), such as tensor processing units (TPUs). According to some examples, the data 1032 and instructions 1034 can include a computer program product downloaded from a communication network and configured to resolve dependency trees using information collected at runtime, as described herein.

The instructions 1034 can include one or more instructions that, when executed by the processors 1020, cause the one or more processors 1020 to perform actions defined by the instructions 1034. The instructions 1034 can be stored in object code format for direct processing by the processors 1020, or in other formats including interpretable scripts or collections of independent source code modules that are interpreted on demand or compiled in advance. The instructions 1034 can include instructions for implementing a dependency tree resolver system, such as described above. The dependency tree resolver system can be executed using the processors 1020, and/or using other processors remotely located from the server computing device 1000.

The data 1032 can be retrieved, stored, or modified by the processors 1020 in accordance with the instructions 1034. The data 1032 can be stored in computer registers, in a relational or non-relational database as a table having a plurality of different fields and records, or as JSON, YAML, proto, or XML documents. The data 1032 can also be formatted in a computer-readable format such as, but not limited to, binary values, ASCII, or Unicode. Moreover, the data 1032 can include information sufficient to identify relevant information, such as numbers, descriptive text, proprietary codes, pointers, references to data stored in other memories, including other network locations, or information that is used by a function to calculate relevant data.

The client computing device 1080 can also be configured similarly to the server computing device 1000, with one or more processors, memory, instructions, and data. The client computing device 1080 can also include a user input and a user output. The user input can include any appropriate mechanism or technique for receiving input from a user, such as keyboard, mouse, mechanical actuators, soft actuators, touchscreens, microphones, and sensors.

The server computing device 1000 can be configured to transmit data to the client computing device 1080, and the client computing device 1080 can be configured to display at least a portion of the received data on a display implemented as part of the user output. The user output can also be used for displaying an interface between the client computing device and the server computing device. The user output can alternatively or additionally include one or more speakers, transducers or other audio outputs, a haptic interface or other tactile feedback that provides non-visual and non-audible information to the platform user of the client computing device.

Although FIG. 10 illustrates the processors and the memories as being within the computing devices, components described herein can include multiple processors and memories that can operate in different physical locations and not within the same computing device. For example, some of the instructions and the data can be stored on a removable SD card and others within a read-only computer chip. Some or all of the instructions and data can be stored in a location physically remote from, yet still accessible by, the processors. Similarly, the processors can include a collection of processors that can perform concurrent and/or sequential operation. The computing devices can each include one or more internal clocks providing timing information, which can be used for time measurement for operations and programs run by the computing devices.

The server computing device can be connected over the network to a data center housing any number of hardware accelerators. The data center can be one of multiple data centers or other facilities in which various types of computing devices, such as hardware accelerators, are located. Computing resources housed in the data center can be specified for deploying models related to resolving dependency trees using the limited information available at runtime, enriching the dependency trees with vulnerability and other information, and recommending remediation options as described herein.

The server computing device can be configured to receive requests to process data from the client computing device on computing resources in the data center. For example, the environment can be part of a computing platform configured to provide a variety of services to users, through various user interfaces and/or application programming interfaces (APIs) exposing the platform services. The client computing device can transmit input data associated with execution of software. For example, the input can include components of the software. The components can include one or more functions utilizing one or more libraries, and logging information for the one or more functions. The dependency tree resolution system 1010 can receive the input data, and in response, determine dependencies of the one or more libraries and generate a resolved dependency tree for the components, wherein the resolved dependency tree can be output to a display. The dependency tree resolution system 1010 can further enrich the resolved dependency tree with the logging information and/or with vulnerability information. Based on the enriched dependency tree, the dependency tree resolution system 1010 can further generate recommended remediation actions for the vulnerabilities. The recommended remediation actions can be sorted and ranked, such that the most effective remediation actions are presented as the highest ranked recommendations.

As other examples of potential services provided by a platform implementing the environment, the server computing device can maintain a variety of models in accordance with different constraints available at the data center. For example, the server computing device can maintain different families for deploying models on various types of TPUs and/or GPUs housed in the data center or otherwise available for processing.

The devices and the data center can be capable of direct and indirect communication over the network. For example, using a network socket, the client computing device can connect to a service operating in the data center through an Internet protocol. The devices can set up listening sockets that may accept an initiating connection for sending and receiving information. The network itself can include various configurations and protocols including the Internet, World Wide Web, intranets, virtual private networks, wide area networks, local networks, and private networks using communication protocols proprietary to one or more companies. The network can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network, in addition or alternatively, can also support wired connections between the devices and the data center, including over various types of Ethernet connection.

Although a single server computing device, client computing device, and data center are shown in FIG. 10, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing optimization models, and any combination thereof.

Although FIG. 10 functionally illustrates the processor, memory, and other elements as being within the same block, the processor, computer, computing device, or memory can actually comprise multiple processors, computers, computing devices, or memories that may or may not be stored within the same physical housing. Accordingly, references to a processor, computer, computing device, or memory will be understood to include references to a collection of processors, computers, computing devices, or memories that may or may not operate in parallel. Yet further, although some functions described below are indicated as taking place on a single computing device having a single processor, various aspects of the subject matter described herein can be implemented by a plurality of computing devices, for example, in the "cloud." Similarly, memory components at different locations may store different portions of instructions 1034 and collectively form a medium for storing the instructions. Various operations described herein as being performed by a computing device may be performed by a virtual machine. By way of example, instructions 1034 may be specific to a first type of server, but the relevant operations may be performed by a second type of server running a hypervisor that emulates the first type of server. The operations may also be performed by a container, e.g., a computing environment that does not rely on an operating system tied to specific types of hardware.

In addition to the systems described above, methods executed by such systems are described below. While operations of each method are described in a particular order, it should be understood that operations may be performed in a different order and/or some operations may be performed simultaneously or in parallel. Moreover, operations can be added or omitted.

Figure 11:
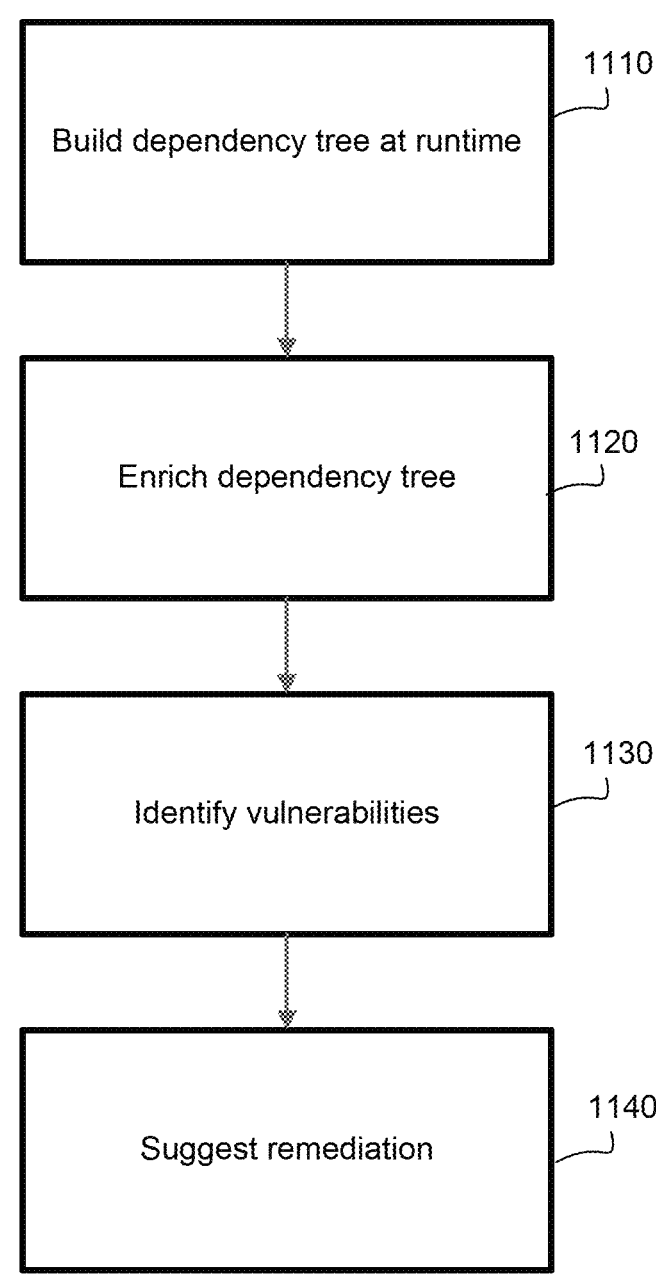
FIG. 11 is a flow diagram illustrating an example method according to aspects of the disclosure.

FIG. 11 illustrates an example method 1100 of dependency tree resolution and remediation using the information available at runtime.

In block 1110, a resolved dependency tree is generated based on execution of a program at runtime. Details of building the resolved dependency tree are described further below in connection with FIG. 12.

In block 1120, the resolved dependency tree is enriched. For example, the resolved dependency tree may be enriched with logging information. The logging information may include data points indicating when (if ever) and how often a function is called at runtime. The data point may include function identifiers, timestamps, etc.

In block 1130, vulnerabilities associated with the resolved dependency tree are identified. The vulnerabilities may be added to the resolved dependency tree as further enrichment. According to some examples, the vulnerabilities may be categorized or sorted, such as by level of criticality, type of vulnerability, etc. According to some examples, the vulnerabilities may be ranked, such as by prioritizing vulnerabilities that are most important to resolve.

In block 1140, remediations are suggested to address the identified vulnerabilities. The remediation suggestions may be based on vulnerability information and the logging information. For example, a plurality of different remediation options may exist, such as rolling back to an older version of a library, updating to a newest version, updating to an intermediate version, etc. Some remediation options may resolve multiple vulnerabilities, while others resolve fewer. Some remediation options may create other issues with the runtime code, while others do not. The remediation options may be ranked based on how well each option will solve the vulnerabilities in the dependency tree. According to some examples, parameters to be prioritized in ranking remediation options may be set or adjusted by a user. For example, a user for one program may select a ranking of the best remediation options that solve a greatest number of vulnerabilities, while a user for another program may select a ranking of the best options that solve the critical vulnerabilities and are easiest to implement. According to some examples, remediation suggestions may be generated using a machine learning model that was trained to identify optimal remediations. The machine learning model may be trained using vulnerability information, logging information, available options, or any of a plurality of other types of information.

Figure 12:
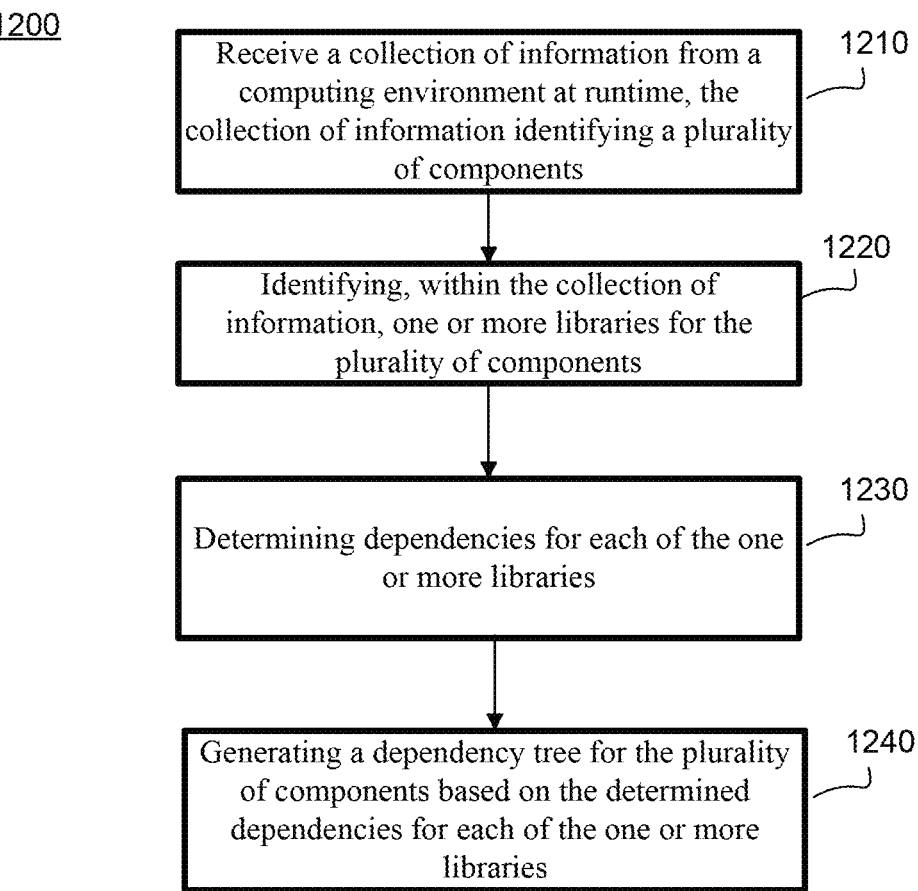
FIG. 12 is a flow diagram illustrating an example method of generating a dependency tree using runtime information according to aspects of the disclosure.

FIG. 12 is a flow diagram illustrating an example method of generating a dependency tree using the information available at runtime.

In block 1210, a collection of information is received from a computing environment at runtime. The collection of information may be, for example, logging information which identifies a plurality of components of a software program. The components include one or more libraries, identified in block 1220.

In block 1230, dependencies for each of the one or more libraries are determined, and in block 1240, a dependency tree is generated based on the dependencies of each of the one or more libraries. For example, one or more dependency crawlers may receive dependency information, such as metadata for the one or more libraries, from websites, APIs, etc. The dependency information is used to compute the resolved dependency tree. The metadata for each library is traversed to determine whether there is a dependency on another program. If there are no dependencies for a library, that library is identified as a direct dependency, and therefore may be represented as a node directly connected to a root of the resolved dependency tree. If a second library is found while traversing the metadata for a first library, the second library is identified as a transitive dependency. Accordingly, the second library may be represented as a node indirectly connected, through the first library, to the root of the resolved dependency tree. Moreover, the second library may then be traversed to determine if further libraries are found within, in which case those libraries may be represented as further extensions along a branch including the second library. Generating the dependency tree may be performed at runtime, or at any other time using the information available at runtime without relying on source code.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks, such as static or dynamic computational graph frameworks.

The term "program" refers to a computer program, software, a software application, an app, a module, a software module, a script, or code. The computer program can be written in any form of programming language, including compiled, interpreted, declarative, or procedural languages, or combinations thereof. The computer program can be deployed in any form, including as a stand alone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
memory; and
one or more processors in communication with the memory and configured to:
receive a collection of runtime information from a remote computing environment, the collection of runtime information identifying a plurality of components;
identify, within the collection of runtime information, one or more libraries for the plurality of components;
determine dependencies for each of the one or more libraries; and
generate a dependency tree for the plurality of components based on the determined dependencies for each of the one or more libraries.

2. The system of claim 1, wherein the one or more processors are further configured to enrich the dependency tree.

3. The system of claim 2, wherein enriching the dependency tree comprises:
determining a number of times that each of one or more particular functions are called at runtime; and
adding annotations to the dependency tree based on the determined number of times.

4. The system of claim 3, wherein the one or more processors are configured to:
determine particular function calls within the collection of runtime information that are most commonly executed at runtime.

5. The system of claim 3, wherein the one or more processors are configured to:
determine particular function calls within the collection of runtime information that are never executed at runtime.

6. The system of claim 3, wherein the one or more particular function calls corresponds to a function with vulnerabilities.

7. The system of claim 6, wherein the one or more processors are further configured to recommend one or more remediations for the vulnerabilities.

8. The system of claim 7, wherein the one or more remediations comprise a change set, wherein the change set identifies a number of required changes to one or more components to remediate one or more of the vulnerabilities.

9. The system of claim 7, wherein the one or more processors are further configured to rank multiple remediation options.

10. The system of claim 9, wherein ranking the multiple remediation options comprises ranking based on one or more of: a number of vulnerabilities each remediation option will address, a number of critical vulnerabilities each remediation option will address, or a ratio of number of changes to number of remediations.

11. The system of claim 1, wherein the one or more processors are configured to detect vulnerabilities, and remediate the detected vulnerabilities each time the dependency tree changes at runtime.

12. The system of claim 1, wherein generating the dependency tree comprises calculating all subtrees for each of the one or more libraries by traversing dependencies and checking whether the dependency is present.

13. The system of claim 12, wherein the one or more processors are further configured to determine that any library that is not found during the traversing is a direct dependency, and build the tree using the direct dependencies.

14. A method of generating a dependency tree using information available at runtime of a program, the method comprising:
receiving, with one or more processors, a collection of runtime information from a remote computing environment, the collection of runtime information identifying a plurality of components;
identifying, with the one or more processors, within the collection of runtime information, one or more libraries for the plurality of components;
determining, with the one or more processors, dependencies for each of the one or more libraries; and
generating with the one or more processors, a dependency tree for the plurality of components based on the determined dependencies for each of the one or more libraries.

15. The method of claim 14, further comprising enriching the dependency tree, comprising:
receiving logging information indicating how particular functions are called at runtime; and
adding annotations to the dependency tree based on the logging information.

16. The method of claim 15, further comprising:
identifying vulnerabilities in the one or more libraries; and
determining one or more remediation actions for the vulnerabilities based at least in part on the logging information.

17. The method of claim 16, wherein the one or more remediation actions comprise a change set, wherein the change set identifies a number of required changes to one or more components to remediate one or more of the vulnerabilities.

18. The method of claim 16, further comprising ranking multiple remediation actions based on one or more of: a number of vulnerabilities each remediation option will address, a number of critical vulnerabilities each remediation option will address, or a ratio of number of changes to number of remediations.

19. A non-transitory computer-readable medium storing instructions executable by one or more processors for performing a method of generating a dependency tree using information available at runtime of a program, the method comprising:

receiving a collection of runtime information from a remote computing environment, the collection of information identifying a plurality of components;

identifying within the collection of runtime information, one or more libraries for the plurality of components;

determining dependencies for each of the one or more libraries; and generating with the one or more processors, a dependency tree for the plurality of components based on the determined dependencies for each of the one or more libraries.

20. The non-transitory computer-readable medium of claim 19, the method further comprising enriching the dependency tree, comprising:

receiving logging information indicating how particular functions are called at runtime; and adding annotations to the dependency tree based on the logging information.

21. The non-transitory computer-readable medium of claim 20, the method further comprising:

identifying vulnerabilities in the one or more libraries; and determining one or more remediation actions for the vulnerabilities based at least in part on the logging information.

22. The non-transitory computer-readable medium of claim 21, wherein the one or more remediation actions comprise a change set, wherein the change set identifies a number of required changes to one or more components to remediate one or more of the vulnerabilities.

23. The non-transitory computer-readable medium of claim 21, the method further comprising ranking multiple remediation actions based on one or more of: a number of vulnerabilities each remediation option will address, a number of critical vulnerabilities each remediation option will address, or a ratio of number of changes to number of remediations.

\* \* \* \* \*